D. N. HONN.
PROCESS FOR PRODUCING FIBER FROM HOP VINES.
APPLICATION FILED SEPT. 29, 1910.
1,060,255.
Patented Apr. 29, 1913.
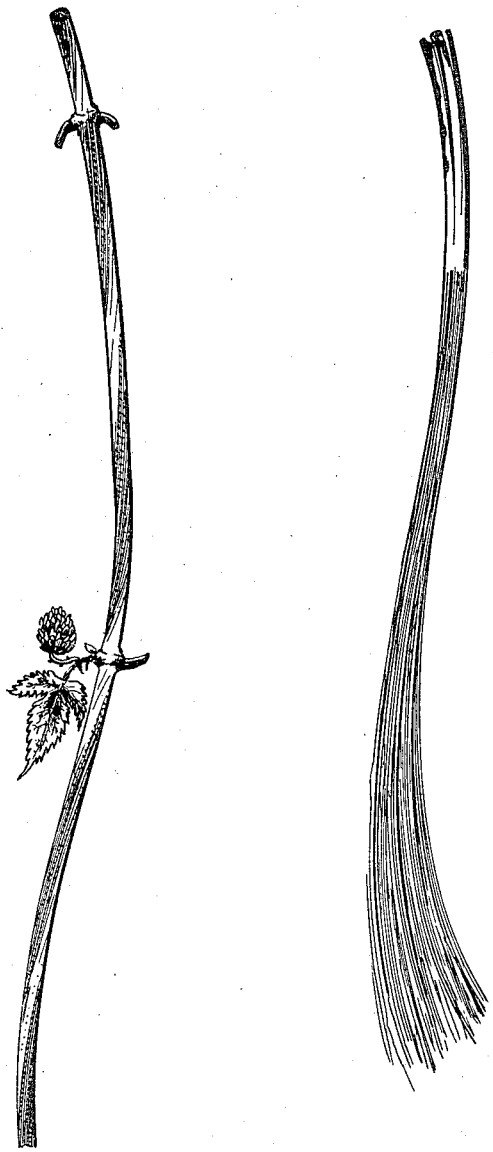
Witnesses
O. B. Hopkins
Inventor
D. N. Honn
by H. B. Willson & Co.
Attorneys

UNITED STATES PATENT OFFICE.

DAVID N. HONN, OF REDDING, CALIFORNIA.

PROCESS FOR PRODUCING FIBER FROM HOP-VINES.

1,060,255.  Specification of Letters Patent.  Patented Apr. 29, 1913.

Application filed September 29, 1910. Serial No. 584,546.

*To all whom it may concern:*

Be it known that I, DAVID N. HONN, a citizen of the United States, residing at Redding, in the county of Shasta and State of California, have invented certain new and useful Improvements in Processes for Producing Fiber from Hop-Vines; and I do declare the following to be a full, clear, and exact description of the invention, such as will enable others skilled in the art to which it appertains to make and use the same.

This invention relates to improvements in the process of producing fiber from hop vines (*Humulus lupulus*).

The object of the invention is to provide a simple and improved process for separating the fiber from the woody parts and pulp of hop vines whereby the latter, which have been heretofore considered useless and thrown away, are given a commercial value.

In the accompanying drawings: Figure 1 is a perspective view of a portion of a hop vine before being treated by my improved process; Fig. 2 is a similar view showing a portion of a vine before being treated and a portion after having been treated to produce the fiber.

In carrying out the invention the hop vines are cut into suitable lengths and tied into small bales, which are placed in tanks of still water. The vines are permitted to soak in this water from ninety to one hundred and twenty days according to the temperature maintained. When the vines have remained in the water for this period of time they will have become sufficiently rotted and are then dried in the sun, or if desired and conditions are such as to require, the same should be dried in kilns or drying houses. After the vines have been thus thoroughly dried they are hackled by pounding or by any other means usually employed in hackling fibers. After the fiber has thus been hackled the same is bleached in the sun and air or in the drying house until the same is white, which part of the process usually requires from thirty to sixty days. The fiber thus produced will be long and fine and will be exceptionally strong and durable. Owing to the abundance of the material in many sections of the country and the simplicity of the process, the fiber may be inexpensively produced by any one and may be used for the purpose of manufacturing any articles from the finest garment to the strongest rope.

Having thus described my invention, what I claim is:

The process of producing fiber from hop vines consisting in cutting the vines into suitable lengths and tying the same into bundles: second; placing the bundles in tanks of still water and permitting the same to soak from ninety to one hundred days so as to enable the vines to become sufficiently rotted: third; after the vines have become sufficiently rotted they are removed from the tanks and dried by any suitable means: fourth; when the vines are sufficiently dried they are hackled by any suitable means: finally after the vines have become sufficiently hackled they are then bleached from thirty to sixty days.

In testimony whereof I have hereunto set my hand in presence of two subscribing witnesses.

DAVID N. HONN.

Witnesses:
JNO. A. RIVERS,
L. J. MARSH.

Copies of this patent may be obtained for five cents each, by addressing the "Commissioner of Patents, Washington, D. C."